(12) United States Patent
Saito

(10) Patent No.: US 8,044,125 B2
(45) Date of Patent: Oct. 25, 2011

(54) FLUORINE-CONTAINING POLYETHEL COMPOUND, PROCESS FOR PRODUCING THE SAME, AND CURABLE COMPOSITION CONTAINING THE SAME

(75) Inventor: Satoru Saito, Ibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 88 days.

(21) Appl. No.: 12/594,851

(22) PCT Filed: Jan. 24, 2008

(86) PCT No.: PCT/JP2008/050940
§ 371 (c)(1),
(2), (4) Date: Oct. 6, 2009

(87) PCT Pub. No.: WO2008/126436
PCT Pub. Date: Oct. 23, 2008

(65) Prior Publication Data
US 2010/0179261 A1    Jul. 15, 2010

(30) Foreign Application Priority Data
Apr. 6, 2007   (JP) .................................. 2007-099998

(51) Int. Cl.
*C08G 18/77* (2006.01)
(52) U.S. Cl. ........ 524/115; 558/161; 524/148; 524/183; 524/176; 524/417; 528/361
(58) Field of Classification Search .................... 524/115
See application file for complete search history.

(56) References Cited

U.S. PATENT DOCUMENTS

| | | | |
|---|---|---|---|
| 5,665,846 A | 9/1997 | Sato et al. | |
| 5,969,216 A | 10/1999 | Duich | |
| 6,034,207 A * | 3/2000 | Koike et al. | 528/402 |
| 6,294,627 B1 | 9/2001 | Worm et al. | |
| 6,307,087 B1 | 10/2001 | Buchwald et al. | |

FOREIGN PATENT DOCUMENTS

| | | |
|---|---|---|
| JP | 64-052733 | 2/1989 |
| JP | 08-199070 | 8/1996 |
| JP | 08-325998 | 12/1996 |
| JP | 11-343336 | 12/1999 |
| JP | 2004-348087 | 12/2004 |
| JP | 2007-106942 | * 4/2007 |

OTHER PUBLICATIONS

Norio Miyaura and Akira Suzuki, *Palladium-Catalyzed Cross-Coupling Reactions of Organoboron Compounds*, American Chemical Society, Jan. 31, 1995 (Revised, Aug. 17, 1995), pp. 2457-2483, Chem. Rev. 1995, 95.

Morgan, et al., *Synthesis, Flame-Retardancy Testing, and Preliminary Mechanism Studies of Nonhalogenated Aromatic Boronic Acids: A New Class of Condensed-Phase Polymer Flame-Retardant Additives for Acrylonitrile-Butadiene-Styrene and Polycarbonate*, Journal of Applied Polymer Science, Aug. 25, 1999 (Revised Sep. 16, 1999), pp. 1257-1268, vol. 76.

English translation of International Preliminary Report on Patentability from corresponding PCT application No. PCT/JP2008/050940, dated Oct. 22, 2009, 5 pages.

* cited by examiner

*Primary Examiner* — Vasu Jagannathan
*Assistant Examiner* — Doris Lee
(74) *Attorney, Agent, or Firm* — Brinks Hofer Gilson & Lione

(57) ABSTRACT

A fluorinated dicarbonyl fluoride FOCCF(CF$_3$)[OCF$_2$CF(CF$_3$)]$_l$OCF$_2$CF$_2$O[CF(CF$_3$)CF$_2$O]$_m$CF(CF$_3$)COF (l+m is 30-130) is reacted with an aromatic amine XC$_6$H$_4$NHR$^1$ (R$^1$ is H, alkyl, or phenyl and X is I or Br) to obtain a fluorinated polyether compound of the following formula. The compound obtained is mixed with an aromatic boric ester, an organopalladium compound, and a basic inorganic or organic compound (and organophosphorus compound) to form a curable fluorinated polyether composition. This curable fluorinated polyether composition has satisfactory processability including moderate flowability at room temperature. It is applicable to various molding techniques including injection molding and RIM.

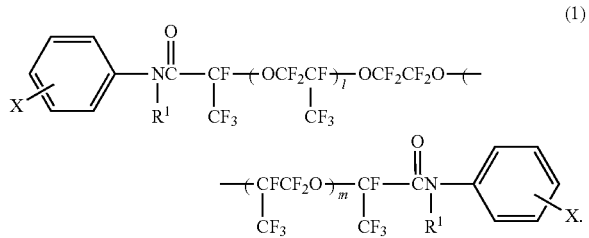

(1)

13 Claims, No Drawings

FLUORINE-CONTAINING POLYETHEL COMPOUND, PROCESS FOR PRODUCING THE SAME, AND CURABLE COMPOSITION CONTAINING THE SAME

TECHNICAL FIELD

The present invention relates to a fluorine-containing polyether compound, a process for producing the same, and a curable composition containing the same, and more particularly a fluorine-containing polyether compound capable of giving cured products having distinguished heat resistance and low-temperature characteristics, and moreover showing a good chemical resistance, a process for producing the same, and a curable composition containing the same.

BACKGROUND ART

For example, compounds represented by the following general formula are known as fluorine-containing polyether compounds having a functional groups at the molecule terminals:

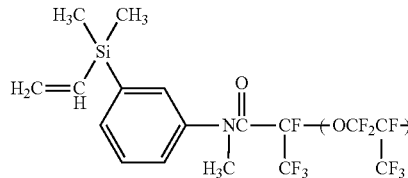

Patent Document 1 JP-A-11-343336

Furthermore, compounds represented by the following formula are known as more popular compounds resulting from oligomerization of the main chain structures of the above-mentioned compounds:

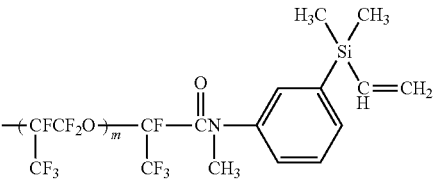

Patent Document 2 JP 2,990,646

It is said that the compounds represented by these general formulae can give elastomeric moldings having much distinguished characteristics (chemical resistance, heat resistance, and low-temperature characteristics) by a fluorine-containing organohydrogen siloxane compound having a plurality of Si—H groups in the molecule and a platinum compound catalyst, and the elastomeric moldings are durable even if used under low-temperature conditions, particularly at about −50° C., without losing the flexibility. Furthermore, it is said that curable compositions containing these compounds as the main component have a remarkable moldability, enabling even RIM molding. However, the cured products have siloxane bonds in the intramolecular cross-linking structure, so, if used in the presence of an acidic substance such as hydrogen fluoride, etc., chemical deterioration and the consequent reduction in the mechanical strength sometimes undesirably takes place.

On the other hand, for example, vinylidene fluoride/tetrafluoroethylene/perfluoro(methyl vinyl ether) terpolymer as popular fluorine-containing elastomer having distinguished low-temperature characteristics have a glass transition temperature Tg of about −25° C. to about −35° C. Furthermore, fluorine-containing elastomers having a glass transition temperature Tg of −35° C. or lower, obtained by copolymerization of perfluoro vinyl ether compounds having perfluoro (alkoxyalkyl) group side chains, as given below, in place of perfluoro(methyl vinyl ether) are also known:

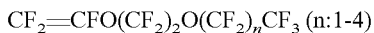
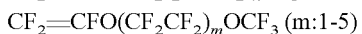
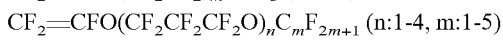

Patent Document 3: U.S. Pat. No. 5,969,216
Patent Document 4: U.S. Pat. No. 6,294,627
Patent Document 5: JP-A-64-52733
Patent Document 6: JP-A-2004-348087

Fluorine-containing elastomers obtained by copolymerization of these perfluoro vinyl ethers have a good chemical resistance, e.g. resistances in the presence of an acidic substance such as hydrogen fluoride, etc., and also have a good heat resistance, but the moldability is still on a level equivalent to that of the usual fluorine-containing elastomers.

DISCLOSURE OF THE INVENTION

Problem to be Solved by the Invention

The object of the present invention is to provide a fluorine-containing polyether compound, curable without any fluorine-containing organohydrogen siloxane compound having Si—H bonds and capable of giving cured products having distinguished heat resistance, low-temperature characteristics, and moldability and a good durability, even if used in acidic conditions, a process for producing the same, and a curable composition containing the same.

Means for Solving the Problem

The present invention provides a fluorine-containing polyether compound represented by the following general formula:

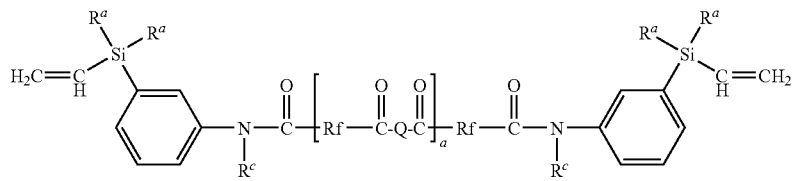

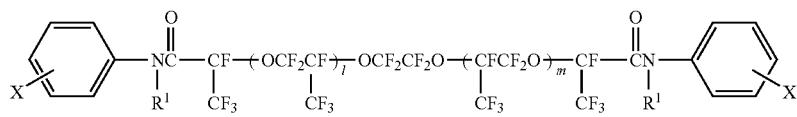

(where $R^1$ is a hydrogen atom, an alkyl group having 1 to 3 carbon atoms, or a phenyl group; X is an iodine atom or a bromine atom, substitution position of X in the phenyl group being a m- or p-position with respect to the $NR^1$ bond substituent; and l and m are independently an integer of 10 or more, l+m being 30 to 130).

The fluorine-containing polyether compound can be prepared by reaction of a fluorine-containing dicarboxylic acid fluoride compound represented by the following general formula:

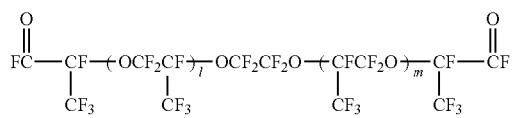

(where l and m are independently an integer of 10 or more, l+m being 30 to 130) with an aromatic primary or secondary amine compound represented by the following general formula:

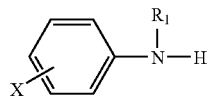

(where $R^1$ is a hydrogen atom, an alkyl group having 1 to 3 carbon atoms, or a phenyl group; and X is an iodine atom or a bromine atom, substitution position of X in the phenyl group is a m- or p-position in respect to $NR^1$ bond substituent), preferably in the presence of pyridine or a tertiary amine compound such as triethylamine, etc.

The fluorine-containing polyether compounds so prepared can be used as the main component of the following curable composition. Specifically, the present curable composition comprises the following components:

|  |  | Parts by weight |
|---|---|---|
| Component (A) | Fluorine-containing polyether compound | 100 |
| Component (B) | Aromatic boronic acid ester compound | 0.1-10 |
| Component (C) | Zero- or di-valent organopalladium compound | 0.0001-1 |
| Component (D) | Basic inorganic or organic compound | 0.1-10 |
| Component (E) | Organophosphorus compound | 0-5 |

Effect of the Invention

The present fluorine-containing polyether compound can be prepared from readily available raw materials by easy reactions. The present curable fluorine-containing polyether composition can be obtained therefrom together with a specific curing agent and a curing catalyst. The present curable fluorine-containing polyether composition has good processabilities such as an appropriate flowability at room temperature, etc. and can be applied to various molding methods such as injection molding, RIM, etc. Cured products having distinguished heat resistance and low-temperature characteristics, and distinguished chemical resistances, even if used in the presence of acidic substances such as hydrogen fluoride, etc. can be obtained by curing the composition. Moldings obtained by curing the composition are suitable for various uses such as seal materials for automobile fuel feed system, oil seal materials, seal materials for aviation fuel system and oil hydraulic system, seal materials for semiconductor production apparatuses owing to the afore-mentioned characteristics.

BEST MODES FOR CARRYING OUT THE INVENTION

In the present fluorine-containing polyether compound represented by the following chemical formula:

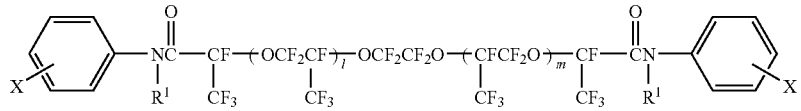

l and m are independently an integer of 10 or more, l+m being an integer of 30 to 130. $R^1$ is a hydrogen atom, an alkyl group having 1 to 3 carbon atoms, or a phenyl group, and preferably a hydrogen atom or a methyl group from the viewpoint of processwise. However, in the case of a hydrogen atom, the viscosity of the resulting fluorine-containing polyether compound has an increasing tendency. X is an iodine atom or a bromine atom, the substitution position of X in the phenyl group being a m- or p-position in respect to $NR^1$ bond substituent.

The present fluorine-containing polyether compound can be prepared, for example, through a series of the following steps:

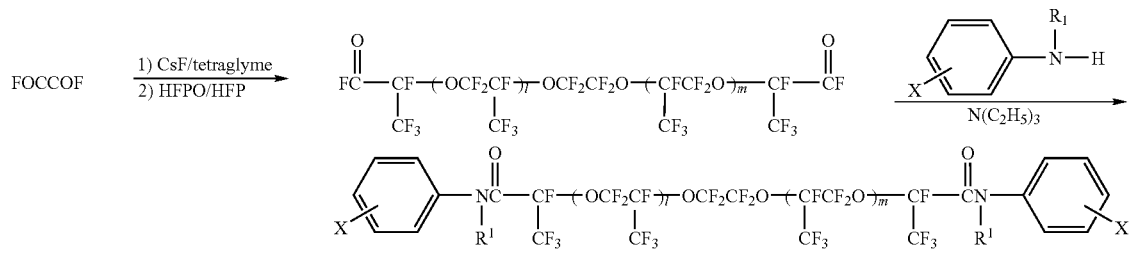

Remark) HFPO: Hexafluoropropene oxide
HFP: Hexafluoropropene

Reaction of a fluorine-containing dicarboxylic acid fluoride with an aromatic primary or secondary amine compound as the final step can be carried out at −50° to 150° C., preferably 0° to 100° C., in the presence of pyridine or a tertiary amine compound such as triethylamine, etc. in a fluorine-containing solvent such as hydrochlorofluorocarbon, hydrofluorocarbon, hydrofluoroether, etc. or a solvent mixture of the fluorine-containing solvent with an aprotic non-fluorine-based solvent. The fluorine-containing solvent includes, for example, HCFC-225, HFE-449 (HFE7100, a product of Sumitomo 3M), HFE-569 (HFE-7200, a product of Sumitomo 3M), etc. The aprotic, non-fluorine-based solvent includes, for example, diethyl ether, diisopropyl ether, cyclopentyl methyl ether, etc. The solvent mixture of the fluorine-containing solvent with the aprotic, non-fluorine-based solvent is preferable to use from the viewpoint of solubility of the primary amine or the secondary amine.

The present fluorine-containing polyether compound can serve as the main component in a curable composition as will be described later, and includes, for example:

The present curable fluorine-containing polyether composition comprises the above-mentioned fluorine-containing polyether compound [Component (A)] as the main component and other components as given below:

|  |  | Parts by weight |
|---|---|---|
| Component (A) | Fluorine-containing polyether compound | 100 |
| Component (B) | Aromatic boronic acid ester compound | 0.1-10 |
| Component (C) | Zero- or di-valent organopalladium compound | 0.0001-1 |
| Component (D) | Basic inorganic or organic compound | 0.1-10 |
| Component (E) | Organophosphorus compound | 0-5 |

Curing reaction of the curable composition is based on cross-coupling reaction of aryl boronic acid or its ester with aryl halide by a palladium catalyst (Suzuki-Miyaura reaction).

Non-Patent Document 1: Chem. Rev. 95 2457 (1995)

Practical modes of the afore-mentioned components will be described below one by one:

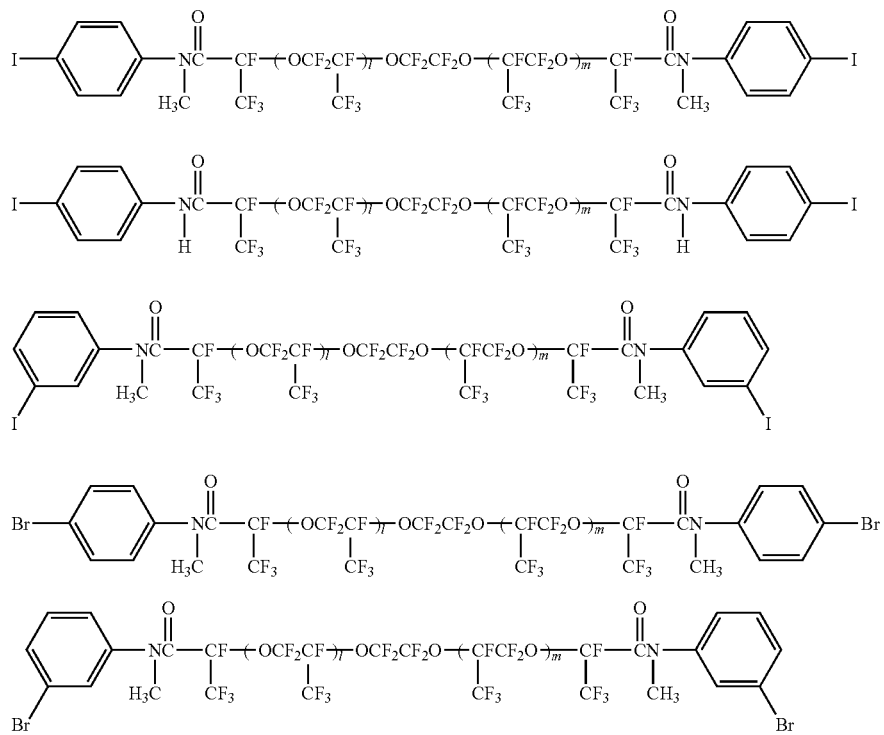

In the fluorine-containing polyether compound as Component (A), represented by the afore-mentioned general formula, l+m is an integer of 30-130, but to obtain a cured product having a sufficient mechanical strength by curing, it is preferable that l+m is an integer of 50-130. $R^1$ is a hydrogen atom, an alkyl group having 1 to 3 carbon atoms, or a phenyl group, but to avoid intramolecular or intermolecular hydrogen bonding, and side reactions at the time of curing, an alkyl group having 1 to 3 carbon atoms or a phenyl group is preferable to use. A methyl group is particularly preferable from the viewpoint of raw material availability. X is either an iodine atom or a bromine atom, but an iodine atom is preferable because a higher curing rate can be obtained. Substitution position of X in the phenyl group is a m- or p-position with respect to the $NR^1$ bond substituent. It is not preferable that the substitution position of X is an o⁻ position, because the curing rate will be lowered due to steric factors.

As to Component (B), an aromatic boronic acid ester compound represented by the following general formula can be used:

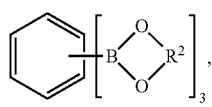

where $R^2$ is a straight or branched divalent aliphatic hydrocarbon group having 2 to 10 carbon atoms, and includes, for example, —CH₂C(CH₃)₂CH₂—, —CH₂CH₂CH₂—, —C(CH₃)₂C(CH₃)₂—, —C(CH₃)₂CH₂C(CH₃)₂—, etc. The aromatic boronic acid ester compound includes, for example, 1,3,5-tris(4,4,5,5-tetramethyl-1,3,2-dioxaborolan-2-yl)benzene, 1,3,5-tris(5,5-dimethyl-1,3,2-dioxaborinan-2-yl)benzene, 1,3,5-tris(4,4,6,6-tetramethyl-1,3,2-dioxaborinan-2-yl)benzene, etc. Preferably, 1,3,5-tris(4,4,5,5-tetramethyl-1,3,2-dioxaborolan-2-yl)benzene can be selected from the viewpoint of easy production.

Non-Patent Document 2: J. Appl. Poly. Sci. 76 1257 (2000)

The aromatic boronic acid ester compound as Component (B) can be used in a proportion of 0.1 to 10 parts by weight, preferably 0.5-5 parts by weight, on the basis of 100 parts by weight of fluorine-containing polyether compound as Component (A). When Component (B) is in a proportion of less than 0.1 parts by weight, curing will be unsatisfactory, or the resulting cured products will have a lower mechanical strength, whereas in a proportion of more than 10 parts by weight, any deserved effect will not be expectable. This is uneconomical.

The organopalladium compound as Component (C) for use as a curing catalyst in the present invention includes a zero- or di-valent organopalladium compound. The zero-valent organopalladium compound can work as a curing reaction catalyst in the zero-valent state as such, whereas the di-valent organopalladium compound can develop a catalytic action upon reduction to zero-valency by Component (A), Component (B), or an organophosphorus compound as Component (E) as will be described later. The organopalladium compound as Component (C) can be used in a proportion of 0.0001 to 1 part by weight, preferably 0.001 to 0.5 parts by weight, on the basis of 100 parts by weight of fluorine-containing polyether compound as Component (A). When Component (C) is used in a proportion of less than 0.0001 part by weight, the curing will be unsatisfactory, whereas a proportion of more than one parts by weight is uneconomical.

The zero-valent organopalladium compound for use in the present invention includes, for example, tetrakis(triphenylphosphine)palladium, bis(dibenzylidene acetone)palladium, tris(dibenzylidene acetone)dipalladium, etc. The di-valent organopalladium compound includes, for example, palladium acetate, allylpalladium chloride, bis(triphenylphosphine)palladium chloride, bis(tri-t-butylphosphine)palladium chloride, etc. Palladium acetate is particularly suitable for use.

When an organopalladium compound containing no phosphorus compound in the molecule, such as palladium acetate, bis(dibenzylidene acetone)palladium, tris(dibenzylidene acetone)dipalladium, and allylpalladium chloride is used, it is preferable to use with an organophosphorus compound as Component (E) represented by the following general formula at the same time:

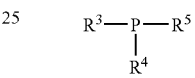

In the above formula, $R^3$, $R^4$ and $R^5$ are independently a linear aliphatic hydrocarbon group having 1 to 10 carbon atoms, a cyclic aliphatic hydrocarbon group having 5 to 12 carbon atoms, and an aromatic hydrocarbon group having 6-20 carbon atoms, each of which can take a substituent. Organophosphorus compounds having an aliphatic hydrocarbon group include, for example, tricyclohexylphosphine, tri-t-butylphosphine, triisopropylphosphine, etc.

The organophosphorus compound having an aromatic hydrocarbon group for use in the present invention includes triphenylphosphine compounds represented by the following general formula:

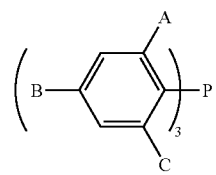

and compounds generally called Buchwald ligands represented by the following general formula:

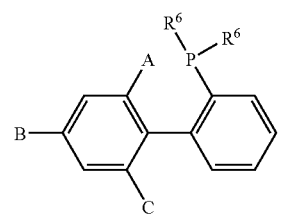

Patent Document 7: U.S. Pat. No. 6,307,087
Patent Document 8: U.S. Pat. No. 6,294,627

In the foregoing formulae, A, B, and C are independently a hydrogen atom, an alkyl group having 1 to 5 carbon atoms, or an alkoxy group or a dialkylamino group, each of which has an alkyl group having 1 to 3 carbon atoms, $R^6$ is an acyclic or a cyclic aliphatic hydrocarbon group having 1 to 6 carbon atoms. The triphenylphosphine compounds include, for example, triphenylphosphine, tris(4-methoxyphenyl)phosphine, tris(1,3,5-triisopropylphenyl)phosphine, etc. The Buchwald ligands include, for example, compounds such as (2-biphenyl)dicyclohexylphosphine, 2-dicyclohexylphosphino-2',6'-dimethoxybiphenyl, 2-di-t-butylphosphino-2',4',6-triisopropylbiphenyl, 2-dicyclohexylphosphino-2-(N,N-dimethylamino)biphenyl, etc.

Furthermore, an organophosphorus compound with bidentate ligands having 2 phosphorus atoms in the molecule, represented by the following general formula can be used:

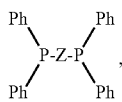

where Ph is a phenyl group, or an aliphatic hydrocarbon group having 1 to 6 carbon atoms, each of which can take a substituent, Z is a divalent aliphatic hydrocarbon group having 1 to 10 carbon atoms, an aromatic hydrocarbon group having 6 to 20 carbon atoms, or a metallocene group.

The organophosphorus compound with bidentate ligands includes, for example, compounds such as 1,2-bis(diphenylphosphino)-ethane, 1,3-bis(diphenylphosphino)propane, 1,4-bis(diphenylphosphino)butane, 1,1'-bis(diphenylphosphino)ferrocene, 1,1'-bis(di-t-butylphosphino)ferrocene, 2,2'-bis(diphenylphosphino)-1,1'-binaphthalene, etc.

The organophosphorus compound as Component (E) can be used in a proportion of 0.5-10 mole equivalent, preferably 1-4 mole equivalent on the basis of the Pd atom of the organopalladium compound as Component (C), and can be also used preferably in a proportion of 0.1-2 parts by weight on the basis of 100 parts by weight of Component (A).

The basic inorganic or organic compound for use in the present invention as Component (D) includes, for example, alkali metal carbonates or alkali metal bicarbonates such as lithium carbonate, sodium carbonate, potassium carbonate, cesium carbonate, lithium hydrogen carbonate, sodium hydrogen carbonate, potassium hydrogen carbonate, etc.; alkali metal phosphates or alkali metal biphosphates such as lithium phosphate, sodium phosphate, potassium phosphate, etc.; oxides or hydroxides of alkali metal or alkaline earth metal such as magnesium oxide, calcium hydroxide, sodium hydroxide, etc.; alkali metal fluorides such as potassium fluoride, sodium fluoride, cesium fluoride, etc.; alkali metal acetates such as potassium acetate, etc.; sodium methoxide; and organic amines. Preferable example is potassium phosphate. The basic inorganic or organic compound as Component (D) can be used in a proportion of 0.1-10 parts by weight, preferably 1-10 parts by weight, on the basis of 100 parts by weight of fluorine-containing polyether compound as Component (A). Without Component (D) the curing reaction will be sometimes much retarded or will fail to take place at all.

The present curable fluorine-containing polyether composition can further contain appropriately other various fillers, reinforcing agents, pigments, etc. appropriately than the afore-mentioned Components, so far as they are in such amounts and purity as not to inhibit the curing reaction. The composition can be prepared by kneading through a three-roll mill, a planetary mixer, etc., and can be cured by compression molding, injection molding, RIM molding and the like at room temperature to 200° C. for about 1 to about 60 minutes, and if necessary, by oven vulcanization (secondary vulcanization) at 50°-250° C. for about 1 to about 30 hours.

EXAMPLES

The present invention will be described in detail below, referring to Examples.

Reference Example

Preparation of Fluorine-Containing Dicarboxylic Acid Fluoride Compound

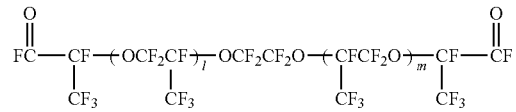

A glass reactor vessel having a net capacity of 1 L, provided with a stirrer, a temperature sensor, a gas inlet, and a dry ice/ethanol cooling condenser, was placed into a low-temperature thermostat tank, and 44 g of a tetraglyme solution containing 23 m moles of a dialkoxide compound having the following formula:

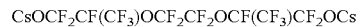

was charged therein. The inside temperature was adjusted to −33° to −30° C., and then 27 g of hexafluoropropene was charged therein through the gas inlet. Then, hexafluoropropene oxide and hexafluoropropene were charged into the reactor vessel at feed rates of 10 g/hr and 4 g/hr, respectively. 27 hours thereafter, the gas feeding was discontinued, and the inside temperature was kept at −33° to −30° C. for further one hour. After hexafluoropropene was removed from the reaction system under subatmospheric pressure, the inside temperature was slowly elevated up to room temperature, and then further up to 100° C., thereby hexafluoropropene oligomers were removed from the reaction mixture under subatmospheric pressure. In this manner, 298 g of a mixture comprising cesium fluoride, tetraglyme, and fluorine-containing dicarboxylic acid fluoride was obtained as a light yellow viscous suspension, which was used in the following step without any purification.

A portion of the afore-mentioned mixture was converted to an ester compound by methanol. Then, number average polymerization degree of hexafluoropropene oxide and its bifunctionality ratio (mole ratio relative to hexafluoropropene oxide oligomers) were determined by $^{19}$F-NMR:

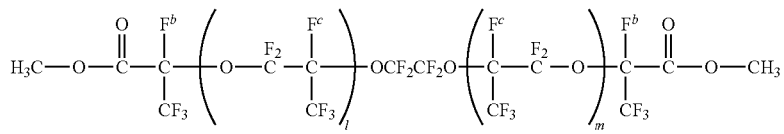

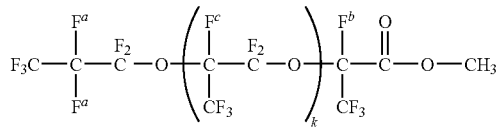

s=$F^a$ (−131 ppm) peak integrated value
t=$F^b$ (−133 ppm) peak integrated value
u=$F^c$ (−146 ppm) peak integrated value
  Note) Chemical shift is based on $CFCl_3$
Difunctionality ratio=(t/s−0.5)/(t/s+0.5)=0.90
Number average polymerization degree of hexafluoropropene oxide=4u/(2t+s)=70

| | |
|---|---|
| $^{19}$F-NMR(Chemical shift was based on $CFCl_3$): | −123 ppm($F^b$) |
| | −146 ppm($F^c$) |
| $^1$H-NMR(Chemical shift was based on TMS): | 7.5 ppm($H^a$) |
| | 6.7 ppm($H^b$) |
| | 3.0 ppm($H^c$) |
| IR(neat): | 1702 cm$^{-1}$(C=O) |
| | 1488 cm$^{-1}$(Ar) |

Example 1

43 g (about 3.6 m moles) of a mixture comprising the fluorine-containing dicarboxylic acid fluoride prepared in Reference Example, cesium fluoride, and tetraglyme was dissolved into 50 ml of a fluorine-containing solvent (HFE-7100, a product of Sumitomo 3M), followed by addition of 1.4 g (14 m moles) of triethylamine and 20 ml of diethyl ether thereto. After further addition of 2.5 g (11 m moles) of p-iodo-N-methylaniline thereto, the mixture was subjected to reaction at room temperature for one hour. The resulting reaction mixture was admixed with an aqueous saturated sodium chloride solution, and the separated organic layer was dried over anhydrous magnesium sulfate, and was filtered. The fluorine-containing solvent and diethyl ether were distilled off from the resulting filtrate under subatmospheric pressure, and then the resulting viscous liquid was washed with diethyl ether several times, and diethyl ether was completely distilled off under subatmospheric pressure, thereby obtaining 35 g of a fluorine-containing polyether compound [PFPE-I;l+m=70] as a slightly yellowish clear liquid:

Example 2

48 g (about 4.0 m moles) of a mixture comprising the fluorine-containing dicarboxylic acid fluoride prepared in Reference Example, cesium fluoride, and tetraglyme was dissolved into 50 ml of a fluorine-containing solvent (HFE-7100), followed by addition of 1.6 g (16 m moles) of triethylamine and 20 ml of diethyl ether thereto. After further addition of 2.2 g (12 m moles) of p-bromo-N-methylaniline thereto, the mixture was subjected to reaction at room temperature for one hour. The resulting reaction mixture was admixed with an aqueous saturated sodium chloride solution, and the separated organic layer was dried over anhydrous magnesium sulfate, and was filtered. The fluorine-containing solvent and diethyl ether were distilled off from the filtrate under subatmospheric pressure, and the resulting viscous liquid was washed with diethyl ether several times, and then diethyl ether was completely distilled off under subatmospheric pressure, thereby 41 g of a fluorine-containing polyether compound [PFPE-Br;l+m=70] as a slightly yellowish

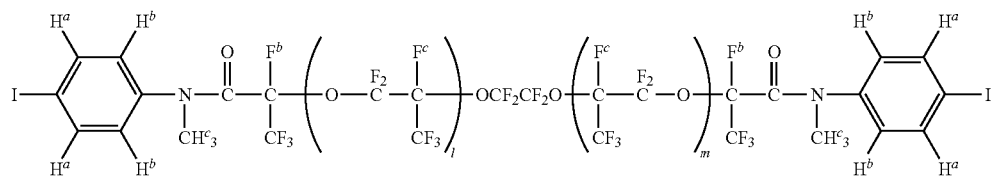

Viscosity was found to be 14.5 Pa·s (25° C.) by an E type viscometer (TEV-22, a product of Toki Sangyo Co.).

clear liquid. Viscosity was found to be 9.8 Pa·s (25° C.) by an E type viscometer (TEV-22):

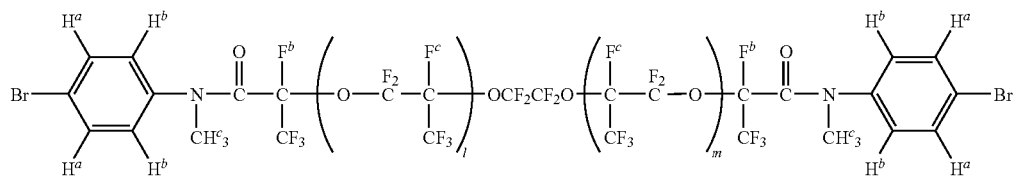

| | |
|---|---|
| $^{19}$F-NMR(Chemical shift was based on CFCl$_3$): | −123 ppm(F$^b$) |
| | −146 ppm(F$^c$) |
| $^1$H-NMR(Chemical shift was based on TMS): | 7.3 ppm(H$^a$) |
| | 6.7 ppm(H$^b$) |
| | 3.0 ppm(H$^c$) |
| IR(neat): | 1703 cm$^{-1}$(C=O) |
| | 1490 cm$^{-1}$(Ar) |

Example 3

| | Parts by weight |
|---|---|
| Fluorine-containing polyether compound of Example 1 | 100 |
| 1,3,5-tris(4,4,5,5-tetramethyl-1,3,2-dioxaborolan-2-yl)-benzene | 3 |
| Palladium acetate | 0.15 |
| (2-biphenyl) dicyclohexylphosphine | 0.5 |
| Potassium phosphate | 5 |

The foregoing components were added to a solvent mixture consisting of 120 parts by weight of ethanol, 25 parts by weight of water, and 300 parts by weight of benzotrifluoride, and mixed together at room temperature for 10 minutes in a nitrogen atmosphere. Then, volatile matters were removed at 40° C. under subatmospheric pressure. The resulting mixture was admixed with 10 parts by weight of acetylene carbon black to prepare a curable composition.

The curable composition was subjected to compression molding at 130° C. for 10 minutes, and then to oven vulcanization (secondary vulcanization) at 80° C. for 5 hours and at 200° C. for 10 hours successively in a nitrogen atmosphere to obtain test pieces.

The resulting curable composition and the resulting vulcanizates were tested to determine the following items Curing test: To determine values of t$_{10}$, t$_{90}$, ML, and MH at 130° C. by a Monsanto disc rheometer Normal state physical properties: According to JIS K6250 and K6253

Compression set: To determine values of P-24 O-rings at 200° C. for 70 hours, according to ASTM D395 method B Low-temperature characteristics: To determine values of TR$_{10}$ and TR$_{70}$, according to ASTM D1329

Methanol immersing test: To determine percent volume change after immersing in methanol at 25° C. for 70 hours Hydrofluoric acid immersing test: To determine percent volume change after immersing in an aqueous 10 wt. % hydrofluoric acid solution at 25° C. for 70 hours

Example 4

In Example 3, a curable composition, wherein (2-biphenyl)-dicyclohexylphosphine was replaced with 0.5 parts by weight of 2-dicyclohexylphosphino-2',6'-dimethoxybiphenyl, was used.

Example 5

In Example 3, a curable composition, wherein (2-bipenyl)-dicyclohexylphosphine was replaced with 0.4 parts by weight of triphenylphosphine, was used.

Comparative Example

The following components were added to 100 parts by weight of a copolymer of CF$_2$=CH$_2$/CF$_2$=CF$_2$/CF$_2$=CFOCF$_3$/CF$_2$=CFO[CF$_2$C(CF$_3$)O]$_5$CF$_3$/CF$_2$=CFOCF$_2$CF$_2$Br (copolymerization mole ratio=70/10/10/9/1) (ηsp/c=1.2; as determined in 1 wt. % solution in C$_6$F$_6$ and polymer Mooney viscosity (121° C.): 70):

| | Parts by weight |
|---|---|
| MT carbon black (Thermax N900, a product of Cancab) | 30 |
| Triallylisocyanurate (TAIC M60, a product of Nippon Kasei Chemical Co.) | 6 |
| Organic peroxide (Perhexa 25B-40, a product of NOF Corp.) | 1.4 |
| ZnO | 4, | followed by mixing through twin roll. The resulting mixture was subjected to compression molding at 180° C. for 10 minutes to form 2 mm thick sheets and P-24 O-rings as vulcanization mold, and further to oven vulcanization (secondary vulcanization) at 230° C. for 24 hours. Molded articles were tested in the same manner as in Examples 3 to 5.

Results of determination in Examples 3 to 5 and Comparative Example are shown in the following Table.

TABLE

| Test item | | Ex. 3 | Ex. 4 | Ex. 5 | Comp. Ex. |
|---|---|---|---|---|---|
| [Curing test] | | | | | |
| Test temperature | (° C.) | 130 | 130 | 130 | 180 |
| t$_{10}$ | (min.) | 0.4 | 0.5 | 0.4 | 0.5 |
| t$_{90}$ | (min.) | 1.0 | 1.1 | 1.0 | 2.6 |
| ML | (dN · m) | 0.2 | 0.2 | 0.2 | 2.0 |
| MH | (dN · m) | 2.5 | 2.6 | 2.6 | 10.7 |
| [Normal state physical properties] | | | | | |
| Hardness | | 52 | 52 | 52 | 59 |
| 100% modulus | (MPa) | 1.2 | 1.2 | 1.1 | 4.5 |
| Strength at break | (MPa) | 2.6 | 2.5 | 2.5 | 11.3 |
| Elongation at break | (%) | 260 | 260 | 260 | 180 |

TABLE-continued

| Test item | | Ex. 3 | Ex. 4 | Ex. 5 | Comp. Ex. |
|---|---|---|---|---|---|
| [Compression set] | | | | | |
| 200° C. for 70 hrs. | (%) | 60 | 62 | 62 | 24 |
| [Low-temperature characteristics] | | | | | |
| $TR_{10}$ | (° C.) | −48 | −46 | −48 | −39 |
| $TR_{70}$ | (° C.) | −34 | −34 | −34 | −29 |
| [Methanol immersing test] | | | | | |
| Percent volume change | (%) | +3 | +3 | +3 | +4 |
| [Hydrofluoric acid immersing test] | | | | | |
| Percent volume change | (%) | +1 | +1 | +1 | +3 |

The invention claimed is:

1. A fluorine-containing polyether compound represented by the following general formula:

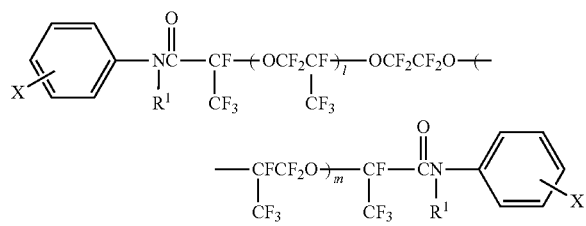

(wherein $R^1$ is a hydrogen atom, an alkyl group having 1 to 3 carbon atoms, or a phenyl group, X is an iodine atom or a bromine atom, substitution position of X in the phenol group being a m- or p-position with respect to the $NR^1$ bond substituent; and l and m are independently an integer of 10 or more, l+m being 30 to 130).

2. A fluorine-containing polyether compound according to claim 1, wherein X of the general formula is an iodine atom.

3. A fluorine-containing polyether compound according to claim 1, wherein $R^1$ of the general formula is a methyl group.

4. A fluorine-containing polyether compound according to claim 1, wherein l+m of the general formula is 50-130.

5. A process for producing a fluorine-containing polyether compound according to claim 1, characterized by subjecting a fluorine-containing dicarboxylic acid fluoride compound represented by the following general formula:

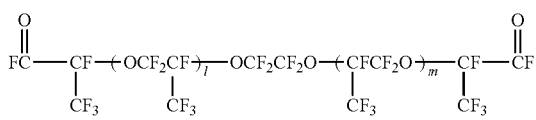

(where l and m are independently an integer of 10 or more, l+m being 30 to 130) to reaction with an aromatic primary or secondary amine compound represented by the following formula:

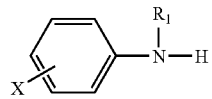

(where $R^1$ is a hydrogen atom, an alkyl group having 1 to 3 carbon atoms, or a phenyl group, and X is an iodine atom or a bromine atom, substitution position of X in the phenyl group being a m- or p-position with respect to $NR^1$ bond substituent).

6. A process for producing a fluorine-containing polyether compound according to claim 5, wherein the reaction is carried out in the presence of pyridine or a tertiary amine compound.

7. A curable fluorine-containing polyether composition, which comprises
(A) 100 parts by weight of a fluorine-containing polyether compound according to claim 1,
(B) 0.1 to 10 parts by weight of an aromatic boronic acid ester compound represented by the following general formula:

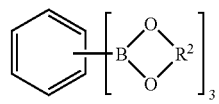

(where $R^2$ is a straight or branched divalent aliphatic hydrocarbon group having 2 to 10 carbon atoms),
(C) 0.0001 to 1 part by weight of a zero- or di-valent organopalladium compound,
(D) 0.1 to 10 parts by weight of a basic inorganic or organic compound, and
(E) 0 to 5 parts by weight of an organophosphorus compound represented by the following general formula:

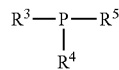

(where $R^3$, $R^4$, and $R^5$ are independently an acyclic aliphatic hydrocarbon group having 1 to 10 carbon atoms, a cyclic aliphatic hydrocarbon group having 5 to 12 carbon atoms, or an aromatic hydrocarbon group having 6 to 20 carbon atoms, each of which is capable of taking a substituent), or by the following general formula:

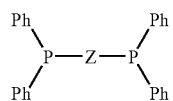

(where Ph is a phenyl group or an aliphatic hydrocarbon group having 1 to 6 carbon atoms, each of which is capable of taking a substituent, and Z is a divalent aliphatic hydrocarbon group having 1 to 10 carbon atoms, an aromatic hydrocarbon group having 6 to 20 carbon atoms or a metallocene group).

8. A curable fluorine-containing polyether composition according to claim 7, wherein Component (A) is a fluorine-containing polyether compound whose X is an iodine atom.

9. A curable fluorine-containing polyether composition according to claim 7, wherein the aromatic boronic acid ester compound as Component (B) is 1,3,5-tris(4,4,5,5-tetramethyl-1,3,2-dioxaborolan-2-yl)benzene having the following formula:

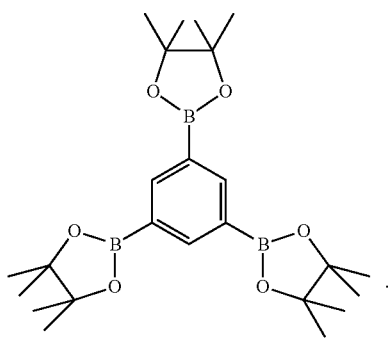

10. A curable fluorine-containing polyether composition according to claim 7, wherein the organopalladium compound as Component (C) is palladium acetate.

11. A curable fluorine-containing polyether compound according to claim 7, wherein the basic inorganic compound as Component (D) is potassium phosphate.

12. A curable fluorine-containing polyether composition according to claim 7, wherein the organophosphorus compound as Component (E) is represented by the following general formula:

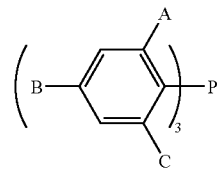

(wherein A, B, and C are independently a hydrogen atom, an alkyl group having 1 to 5 carbon atoms, or an alkoxy group or a dialkylamino group, each of which has an alkyl group having 1 to 3 carbon atoms).

13. A curable fluorine-containing polyether composition according to claim 7, wherein the organophosphorus compound as Component (E) is represented by the following general formula:

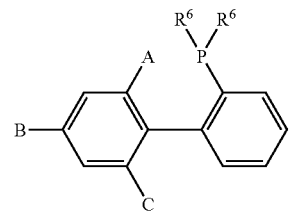

(where A, B, and C are independently a hydrogen atom, an alkyl group having 1 to 5 carbon atoms, or an alkoxy group or a dialkylamino group, each of which has an alkyl group having 1 to 3 carbon atoms, $R^6$ is an acylic or a cyclic aliphatic hydrocarbon group having 1 to 6 carbon atoms).

* * * * *